United States Patent
Yeh et al.

(10) Patent No.: US 7,289,425 B2
(45) Date of Patent: Oct. 30, 2007

(54) PARALLEL ORTHOGONAL FREQUENCY DIVISION MULTIPLEXED COMMUNICATION SYSTEM

(75) Inventors: Hen-Geul Yeh, Cypress, CA (US); Charles C. Wang, Arcadia, CA (US)

(73) Assignee: The Aerospace Corporation, El Segundo, CA (US)

(*) Notice: Subject to any disclaimer, the term of this patent is extended or adjusted under 35 U.S.C. 154(b) by 1022 days.

(21) Appl. No.: 10/600,310

(22) Filed: Jun. 20, 2003

(65) Prior Publication Data

US 2004/0257980 A1    Dec. 23, 2004

(51) Int. Cl.
*H04J 11/00*    (2006.01)

(52) U.S. Cl. .................. 370/208; 370/210; 375/235; 375/237

(58) Field of Classification Search ........... None
See application file for complete search history.

(56) References Cited

U.S. PATENT DOCUMENTS

| | | | |
|---|---|---|---|
| 6,912,258 B2* | 6/2005 | Birru .................. | 375/340 |
| 6,952,394 B1* | 10/2005 | Kim et al. .................. | 370/208 |
| 7,058,134 B2* | 6/2006 | Sampath .................. | 375/260 |
| 2006/0250936 A1* | 11/2006 | Chen et al. .................. | 370/208 |

* cited by examiner

*Primary Examiner*—Chi Pham
*Assistant Examiner*—Soon D. Hyun
(74) *Attorney, Agent, or Firm*—Derrick Michael Reid

(57) ABSTRACT

A parallel orthogonal frequency division multiplexed (OFDM) communications system includes a transmitter and receiver, the transmitter having a parallel fast Fourier transform (FFT) module operating in parallel to a conventional inverse fast Fourier transform (IFFT) module for providing respective orthogonal outputs received by the receiver. The receiver has a parallel IFFT module and a conventional FFT module for providing respective orthogonal outputs. The respective orthogonal outputs are combined to form a composite signal that provides improved insensitivity to relative frequency offsets and Doppler frequency offsets. The parallel FFT and IFFT modules in the OFDM communication system provides improved signal diversity and performance in the presence of relative frequency offsets and Doppler frequency offsets, and provides improved tracking capability for the receiver with backward compatibility.

17 Claims, 4 Drawing Sheets

OFDM WEIGHTING FUNCTION

OFDM TRANSMITTER

OFDM RECEIVER

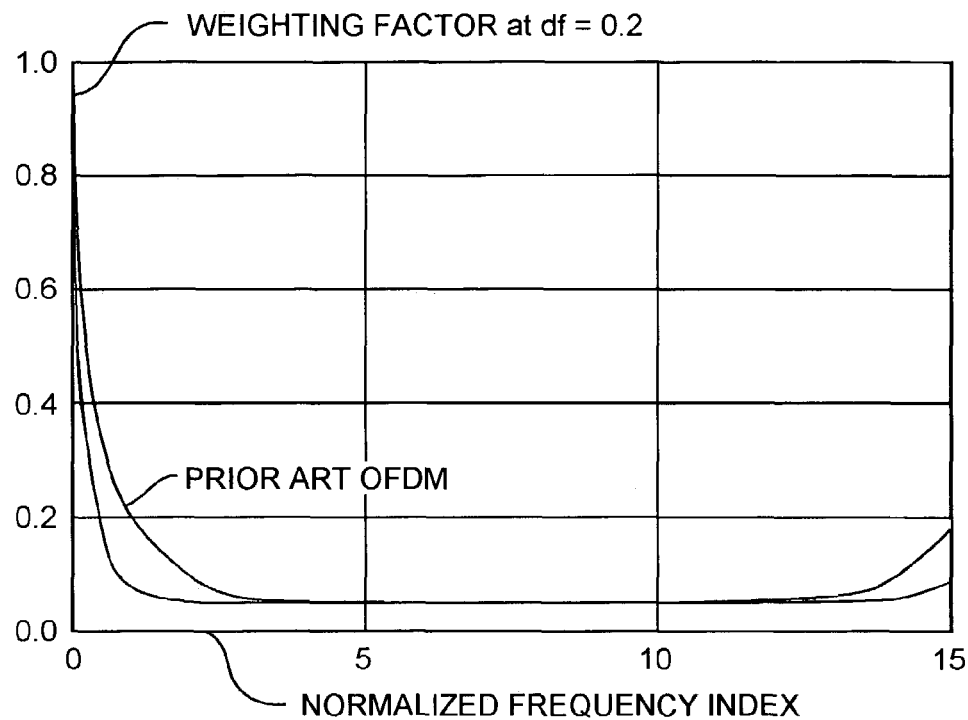
FIG. 2   OFDM WEIGHTING FUNCTION
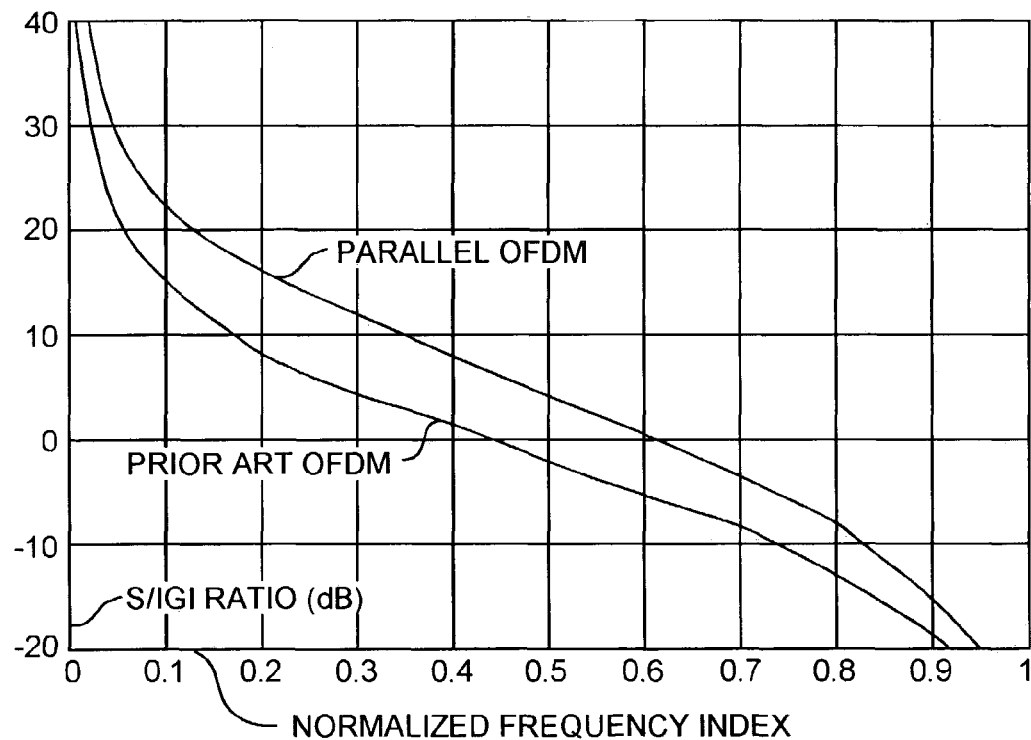
FIG. 3   SIGNAL TO INTERCARRIER INTERFERENCE RATIO

BER PERFORMANCE OF OFDM SYSTEMS

PARALLEL ORTHOGONAL FREQUENCY DIVISION MULTIPLEXED COMMUNICATION SYSTEM

FIELD OF THE INVENTION

The invention relates to the field of communication systems. More particularly, the present invention relates to orthogonal communication systems having channel frequency division multiplexing.

BACKGROUND OF THE INVENTION

Communication systems use various modulation and multiplexing techniques for communicating signals from a transmitter to a receiver. Multicarrier modulations, such as orthogonal frequency division multiplexing (OFDM), have been used due to advantages of improved bandwidth efficiency and data throughput over, for examples, the mobile radio channel. OFDM is an effective technique to mitigate the effects of delay spread introduced by the mobile radio channels. OFDM provides high spectral efficiency by adopting the orthogonal subcarriers and reduces the effects of intersymbol interference (ISI) by inserting the guard time between symbols to accommodate the delay spread caused by multipath.

Due to the advantages of improving bandwidth efficiency and data throughput over fading dispersive channels, OFDM has been used in many new digital wireless applications including digital video broadcasting, digital audio broadcasting, and wireless local area networks. The OFDM technique has also been proposed for a new third generation wireless systems. One of the major disadvantages of such a multicarrier modulated system is the performance sensitivity to frequency offsets. A frequency offset can result from a Doppler shift due to the mobile environment as well as from a carrier frequency synchronization error. Such a frequency offset causes a loss of the carrier orthogonality, and hence, self-introduced intercarrier interference (ICI). ICI, due to frequency offsets, affects the performance of OFDM communication systems.

In an OFDM system, the input binary data stream is firstly mapped to a signal constellation of M-ary phase shifted keying modulation or M-ary quadrature amplitude modulation. Regardless of the modulation scheme used, the mapped symbols can be represented by a series of complex numbers in vector space. Then, N complex numbers are grouped together and in turn amplitude modulated onto N orthogonal subcarriers. These N modulated subcarriers are combined to form a composite signal called an OFDM symbol. The duration $T_{OFDM}$ for an OFDM symbol is $N \cdot T_s$ where $T_s$ is the data symbol time duration. The mapping, grouping, amplitude modulation, and combining processes continues for every N data symbols of complex numbers. Each input M-ary data stream is communicated by frequency division across the frequency bandwidth of the communication channel. On the receiver side, OFDM symbols are frequency demodulated using the same N subcarriers. At the end of each OFDM symbol, the magnitude of a complex value associated with each of the N subcarriers will be extracted. These N complex numbers are placed in sequential order and the M-ary data is recovered based on the signal constellation mapping. It is well known that the discrete Fourier transforms (DFT) can be used to realize the orthogonal frequency modulation. Also, the forward fast Fourier transform (FFT) is an effective way to implement the DFTs.

Referring to FIGS. 1A and 1B, a conventional OFDM transmitter, shown as a module, and a conventional OFDM receiver, also shown as a module, form a conventional OFDM communication system. The transmitter includes an inverse FFT (IFFT) and the receiver includes an FFT. In the conventional OFDM transmitter, a serial-to-parallel operation and a mapping operation essentially perform the grouping of N consecutive data symbols into N parallel inputs to IFFT. The IFFT will take time to complete the inverse transform operation, which essentially puts N parallel inputs to N orthogonal subcarriers. After the IFFT operation, N symbols are serialized by a parallel-to-serial operation with an equal-time spacing between consecutive samples of the IFFT output sequence. The output sequence is transmitted using conventional digital-to-analog conversion and high power amplification, not shown. The reverse operations to the transmitter occur in the receiver. The existing forward and inverse transforms of the conventional OFDM system is given by a transmitter baseband IFFT equation and a receiver baseband FFT equation.

The IFFT employed at the transmitter is defined by the transmitter baseband IFFT equation.

$$x_k = \sum_{n=0}^{N-1} d_n e^{j\frac{2\pi}{N}nk} \quad k = 0, 1, 2, \ldots, N-1$$

In the transmitter baseband IFFT equation, $d_n$ is the sequence of input data symbols, k is the output symbol index, N is the number of subcarriers, $x_k$ is the output of the IFFT transmitter. After the IFFT transmitter output $x_k$ is communicated over an additive white Gaussian noise (AWGN) channel, the received signal is $r_k = x_k + w_k$ where $w_k$ is the channel AWGN. The FFT employed at the receiver is defined by the receiver baseband FFT equation.

$$\hat{d}_k = \frac{1}{N} \sum_{n=0}^{N-1} r_n e^{-j\frac{2\pi}{N}nk} \quad k = 0, 1, 2, \ldots, N-1$$

In the receiver baseband FFT equation, $\hat{d}_k$ is the output of the FFT receiver as the estimated transmitter input data symbol, and N is the number of subcarriers. In order to maintain orthogonality without crosstalk among the subcarriers at the receiver, two conditions must be satisfied, that is, the demodulating carriers need to be exactly aligned with the transmitted carriers, and the receiver demodulation process takes place over a period of time exactly equal to the reciprocal of the subcarrier spacing $\Delta f$. If either of these conditions does not exist, the orthogonality is no longer perfectly maintained and the intercarrier interference (ICI), or, crosstalk, is self-generated. One of the major disadvantages of an OFDM system is the sensitivity of performance to a frequency offset. The frequency offset can result from a Doppler shift due to mobile environment as well as from a carrier frequency synchronization error. Such a frequency offset causes a loss of subcarrier orthogonality, and hence, self-introduced ICI. As a result, the desired signal is distorted and the bit-error-rate (BER) performance is degraded.

An OFDM signal is a composite signal of N component signals, modulated on N orthogonal subcarriers. The desired component signal should ideally be only on the desired subcarrier of interest. In the presence of frequency offset, the signal strength at any desired subcarrier will be reduced and the signal will leak into other undesired subcarriers, meaning that there exists ICI from a subcarrier to other subcarriers, at the output of the FFT receiver. Without losing generality, the desired component signal is on the subcarrier with an index zero for the FFT operation. Referring to all of the Figures, and particularly to FIG. 2, a weighting factor is defined as the square root of the percentage of the signal power, located on a particular subcarrier, that leaks to each of the other undesired subcarriers. When there is no frequency offset, the weighting factor should be 1.0 at the subcarrier index zero, and the weighting factor should be zero for all other indices. For weighting factors of a 16-point FFT with a frequency offset of $0.2 \cdot \Delta f$, the weighting factor on the desired signal is less than 1 and those on other undesired sub-carriers are greater than 0. These non-zero weighting factors represent ICI. Practically, there is a limitation on the frequency offset that an OFDM receiver can tolerate. Such limitations for a 16-QAM OFDM system is 4% or less of $\Delta f$. Conventional systems have a 4% frequency offset limitation of the intercarrier frequency spacing when N=16.

The existing architecture of OFDM includes a transmitter, and using an inverse transform function, communicating with a receiver using a forward transform function. These paired transform functions are well known to have a limitation on the frequency offset that the receiver can tolerate within acceptable performance expectations. This performance limitation results from signal distortion due to the intercarrier interference when the frequency offset exists. These and other disadvantages are solved or reduced using the invention.

SUMMARY OF THE INVENTION

An object of the invention is to provide improved performance of an orthogonal frequency division multiplexed (OFDM) communications system.

Another object of the invention is to provide an orthogonal frequency division multiplexed (OFDM) communications system using a parallel architecture.

Yet another object of the invention is to provide an OFDM communications system using a parallel architecture with improved performance in the presence of frequency offsets.

Still another object of the invention is to provide an OFDM communications system using a parallel architecture with two parallel but inverse functioning transforms in the transmitter, and with two parallel inverse function transforms in the receivers for improved performance in the presence of relative frequency offsets and Doppler frequency offsets.

The present invention is directed to a parallel architecture for an orthogonal communication system having divisional multiplexing (DM) and have dual inverse transformation operations. In the preferred form, the divisional multiplexing is frequency division multiplexing, and hence, the present invention is directed to an OFDM communications system. The transmitter and receiver use inverse transforms that do not affect subcarrier orthogonality. The forward fast Fourier transform (FFT) and the inverse fast Fourier transform (IFFT) are used in the preferred form. The parallel architecture provides for the communication of a second multiplexed signal that is combined during reception for providing improved performance in the presence of frequency offsets.

An OFDM transmitter is equipped with a conventional inverse fast Fourier transform (IFFT) OFDM transmitter module connected in parallel to a forward fast Fourier transform (FFT) OFDM transmitter module, with both transmitter modules divisionally multiplexed together for providing two separate signals prior to transmission. The OFDM receiver is equipped with a conventional FFT OFDM receiver module connected in parallel to a parallel IFFT OFDM receiver module, with both receiver modules connected to a front end demultiplexer. That is, the parallel transmitter architecture includes a conventional IFFT transmitter module in parallel with a parallel FFT transmitter module, and the parallel receiver architecture includes a conventional FFT receiver module in parallel with a parallel IFFT receiver module. Hence, both the transmitter and receiver provide dual FFT and IFFT operations, along separate but parallel processing paths, differentiated by a transmitter back end multiplexer and a receiver front end demultiplexer. The parallel architecture contains the conventional OFDM operation and an additional parallel inverse OFDM operation. The conventional transmitter IFFT module operates in combination with the conventional receiver FFT module. The parallel transmitter FFT module operates in combination with the parallel receiver IFFT module. The use of a transmitter divisional multiplexer (DM) and a receiver divisional demultiplexer (DD) enable the two parallel processing paths to be processed together through a single transmitter and receiver.

The dual architecture provides additional signal diversity to the OFDM communication system. The parallel architecture provides improved performance for the OFDM system in the presence of relative frequency offsets and Doppler frequency offsets, and provides improved tracking capability for the receiver, while further providing backward compatibility with conventional OFDM systems. The combination of the two parallel transformation paths is used to provide improved system performance. This dual function effectively provides signal diversity.

The divisional multiplexing and divisional demultiplexing functions are preferably frequency division multiplexing, but can be code division multiplexing, or time division multiplexing, all of which respectively provide code diversity, frequency diversity, or time diversity. The receiver contains a divisional demultiplexer for demultiplexing the input signal to either the conventional FFT receiver module or the parallel IFFT receiver module. The divisional demultiplexer decomposes the divisional multiplexed input to the receiver for providing respective forward and inverse transformed received signals. The forward and inverse transformed received signals after respective FFT and IFFT operations are demodulated simultaneously and combined to form the final detected data symbol signal offering improved system performance.

In the presence of frequency offset, there exists intercarrier interference (ICI) from a subcarrier to other subcarriers at the output of the conventional FFT receiver module. As a result, the signal strength at any desired subcarrier will be reduced and the signal will leak into other undesired subcarriers. In the parallel architecture, the parallel IFFT receiver module generates an ICI signal that has the opposite polarity to the one generated by the conventional FFT receiver module. Therefore, after combining the two demodulated signals from two parallel paths, the majority part of the ICI signal is cancelled out with some residual ICI signal left. The parallel OFDM system provides significantly smaller weighting factors on undesired subcarriers while maintaining the same weighting factor on the desired subcarrier as that of the conventional OFDM system. As a result, the ICI is significantly reduced with improved performance.

Conventional OFDM communications systems can be upgraded to add the parallel OFDM FFT module in the transmitter and OFDM IFFT module in the receiver with backward compatibility. The backward compatibility is retained because the parallel structure contains the conventional architecture as a standing-alone alone operation with the additional parallel functions. These and other advantages will become more apparent from the following detailed description of the preferred embodiment.

BRIEF DESCRIPTION OF THE DRAWINGS

FIG. 2 is a graph of orthogonal frequency division multiplexed weighting factors.

FIG. 3 is a graph of the signal to intercarrier interference ratio.

DETAILED DESCRIPTION OF THE PREFERRED EMBODIMENT

Figure 1A:
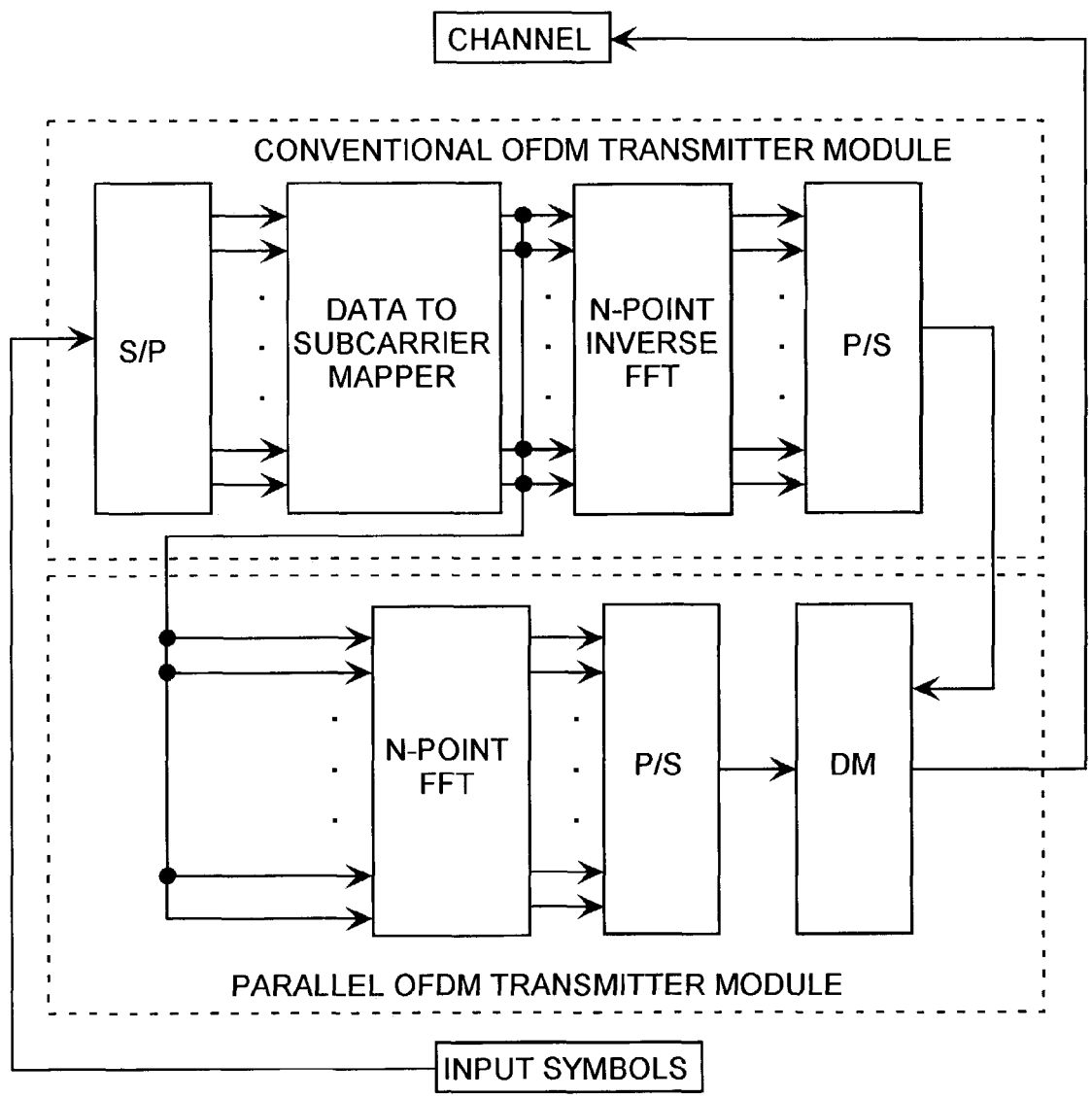
FIG. 1A is a block diagram of an orthogonal frequency division multiplexed transmitter.

An embodiment of the invention is described with reference to the figures using reference designations as shown in the figures. Referring to FIG. 1A, an orthogonal frequency division multiplexing (OFDM) transmitter includes a conventional OFDM transmitter module in parallel to a parallel OFDM transmitter module. Serial input symbols are fed into a first serial-to-parallel converter for providing a first parallel symbols input to a first data-to-subcarrier mapper. The first data-to-subcarrier mapper provides first parallel subcarrier data to an N-point inverse fast Fourier transform (IFFT) providing parallel inverse transformed data that is serialized by a parallel-to-serial converter for providing a first serial transmitter output. Preferably, the parallel subcarrier data from the data-to-subcarrier mapper of the conventional OFDM transmitter module is clocked into an N-point fast Fourier transform (FFT) that provides parallel forward transformed data. It should be apparent that the parallel OFDM transmitter module may alternatively have a second serial-to-parallel converter and a second data mapper so as to receive the input symbols and provide a second parallel symbols input and second parallel subcarrier data to the FFT in the parallel OFDM transmitter module. The parallel forward transformed data from FFT in the parallel OFDM transmitter module is serialized by a second parallel-to-serial converter for providing a second serial transmitter output. The first and second serial transmitter outputs are fed into a divisional multiplexer for combining the first and the second serial transmitter outputs as a divisional multiplexed transmitter composite output signal. In the preferred form, frequency division is used, but code and time divisional multiplexing could be used as well. The composite transmitter output signal is communicated over a channel, and is received by a receiver as a composite received input signal.

Figure 1B:
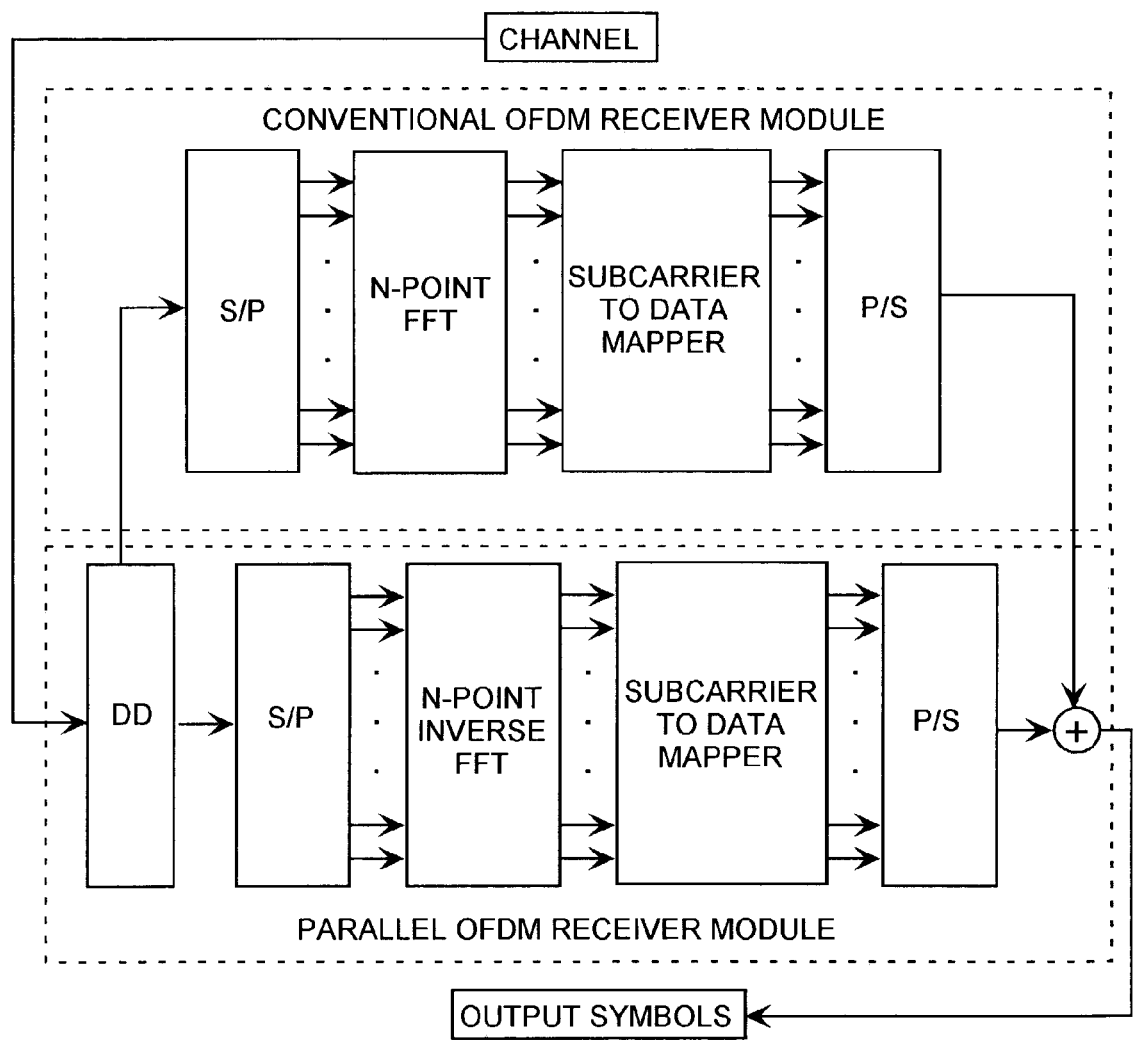
FIG. 1B is a block diagram of an orthogonal frequency division multiplexed receiver.

Referring to FIG. 1B, an OFDM receiver includes a conventional OFDM receiver module and a parallel OFDM receiver module. The divisional multiplexed transmitter composite output signal is communicated over the channel and is received as the composite received signal. The composite received signal is fed into a divisional demultiplexer in the OFDM receiver for demultiplexing the composite received signal into an inverse transformed received signal and a forward transformed received signal. The inverse transformed received signal-originates from the first serial transmitter output and the forward transformed received signal originates from the second serial transmitter output.

The inverse transformed received signal is communicated to the conventional OFDM receiver module and fed into a first serial-to-parallel converter for providing first parallel received inputs. In the conventional OFDM receiver module, the first parallel received inputs are fed into an N-point FFT for providing first parallel mapped signals. The first parallel mapped signals are fed into a first subcarrier-to-data mapper for providing first parallel demodulated signals that are in turn fed into a first parallel-to-serial converter for providing a first serial demodulated signal.

In the parallel OFDM receiver module, the forward transformed received signal is communicated to a second serial-to-parallel converter for providing second parallel received inputs. In the parallel OFDM receiver module, the second parallel received inputs are fed into an N-point IFFT for providing second parallel mapped signals. The second parallel mapped signals are fed into a second subcarrier-to-data mapper for providing second parallel demodulated signals that are in turn fed into a second parallel-to-serial converter for providing a second serial demodulated signal. Finally, the first and second demodulated signals are summed together by a summer for providing an average output signal. In this manner, two receiver output signals, independently processed and generated by parallel forward and inverse transformation processes, are averaged for providing an output signal, which is the estimate of the input symbol sequence into the transmitter.

The parallel OFDM system employs transform processes that can be described by equations. The transform processes include two conventional transforms and two additional transforms. The transmitter contains the conventional transmitter IFFT module that is described by the transmitter baseband IFFT equation, and the parallel transmitter FFT module, that is described by a transmitter baseband FFT equation.

$$x'_k = \sum_{n=0}^{N-1} d_n e^{-j\frac{2\pi}{N}nk} \quad k = 0, 1, 2, \ldots, N-1$$

In the transmitter baseband FFT equation, $d_n$ is the sequence of input data symbols, k is the FFT output symbol index, N is the number of subcarriers, and $x'_k$ is the output of the parallel transmitter FFT module. The receiver contains the conventional receiver FFT module and the parallel receiver IFFT module. After the parallel transmitter FFT output $x'_k$ is communicated over an additive white Gaussian noise (AWGN) channel, the parallel transmitter FFT output is then passed through the second serial-to-parallel converter. The second parallel received input to the parallel receiver IFFT module is $r'_k = x'_k + w'_k$ where $w'_k$ is the channel AWGN. The parallel receiver IFFT module is described by a receiver baseband IFFT equation.

$$\hat{d}'_k = \frac{1}{N}\sum_{n=0}^{N-1} r'_n e^{j\frac{2\pi}{N}nk} \quad k = 0, 1, 2, \ldots, N-1$$

The outputs-from the conventional receiver FFT module and the parallel receiver IFFT module are summed by the summer to combine the receiver IFFT and FFT outputs as described in a receiver baseband combine equation.

$$d_{avek} = \tfrac{1}{2}(d'_k + d_k) \quad k = 0, 1, 2, \ldots, N-1$$

In the receiver baseband IFFT equation, $d'_k$ is the output of the receiver IFFT module, N is the number of subcarriers. In the receiver baseband combine equation, $d_{avek}$ is the average received signal providing improved performance.

When a frequency offset exists, the FFT operation alone in the receiver will generate intercarrier interference (ICI), which will interfere with the data on the desired subcarrier and in turn degrade the performance. The additional receiver IFFT in combination with the additional transmitter FFT provides a smaller ICI on undesired subcarriers while maintaining the same signal strength on the desired subcarrier as that of the existing OFDM system. Consequently, the additional transmitter FFT and additional receiver IFFT improves the signal to ICI ratio and effectively mitigates ICI.

The system includes a conventional OFDM operation with conventional transform processes and a parallel OFDM operation with an additional transform process. These transform processes are preferably the same FFT and IFFT transform processes, but in reversed order. Either a code division multiplexing, time division multiplexing or frequency division multiplexing can be applied to the multiplexer. The transmitter provides two baseband signals received and processed by the receiver. The parallel OFDM receiver module preferably contains the demultiplexer and a receiver IFFT. The demultiplexer demultiplexes the two mixed received signals inversely to the multiplexing of the multiplexer in the transmitter. The demultiplexer provides two separate parallel signals in the receiver. These two received signals are respectively forwardly and inversely transformed simultaneously and then averaged to obtain average output signal providing the final signal indicating the estimated input symbol sequence of the transmitter. The averaging of the receiver output signals improves the frequency offset limitations.

Referring to FIGS. 1A through 2, and more particularly to FIG. 2, the weighting factor for the system can be reduced on a particular subcarrier, that leaks to each of the other undesired subcarriers. The magnitudes of the weighting factors of the parallel OFDM system with a frequency offset of $0.2 \cdot \Delta f$ are indicated for a 16-point FFT. Without losing the generality, a desired signal can have a frequency index of zero. The desired signal power should ideally be completely on the subcarrier with a frequency index zero for the FFT operation. When there is no frequency offset, the weighting factor should be 1.0 at the frequency index zero, and the weighting factor should be zero for all other indices. For weighting factors of a 16-point FFT with a frequency offset of $0.2 \cdot \Delta f$, the weighting factor on the desired signal is less than 1 and those on other undesired sub-carriers are greater than 0. These non-zero weighting factors represent ICI as a limitation on the frequency offset that an OFDM receiver can tolerate.

Referring to FIGS. 1A through 3, and more particularly to FIG. 3, the system provides significant advantage of signal to ICI power ratio over the conventional OFDM systems when frequency offset exists. FIG. 3 shows the signal to ICI power ratio (SICIR) as a function of frequency offset for N=16. The system has a SICIR advantage of about 7 dB improvement at a frequency offset of $0.04 \cdot \Delta f$ for N=16. Consequently, this parallel OFDM system improves the SICIR and effectively mitigates the ICI problem.

Figure 4:
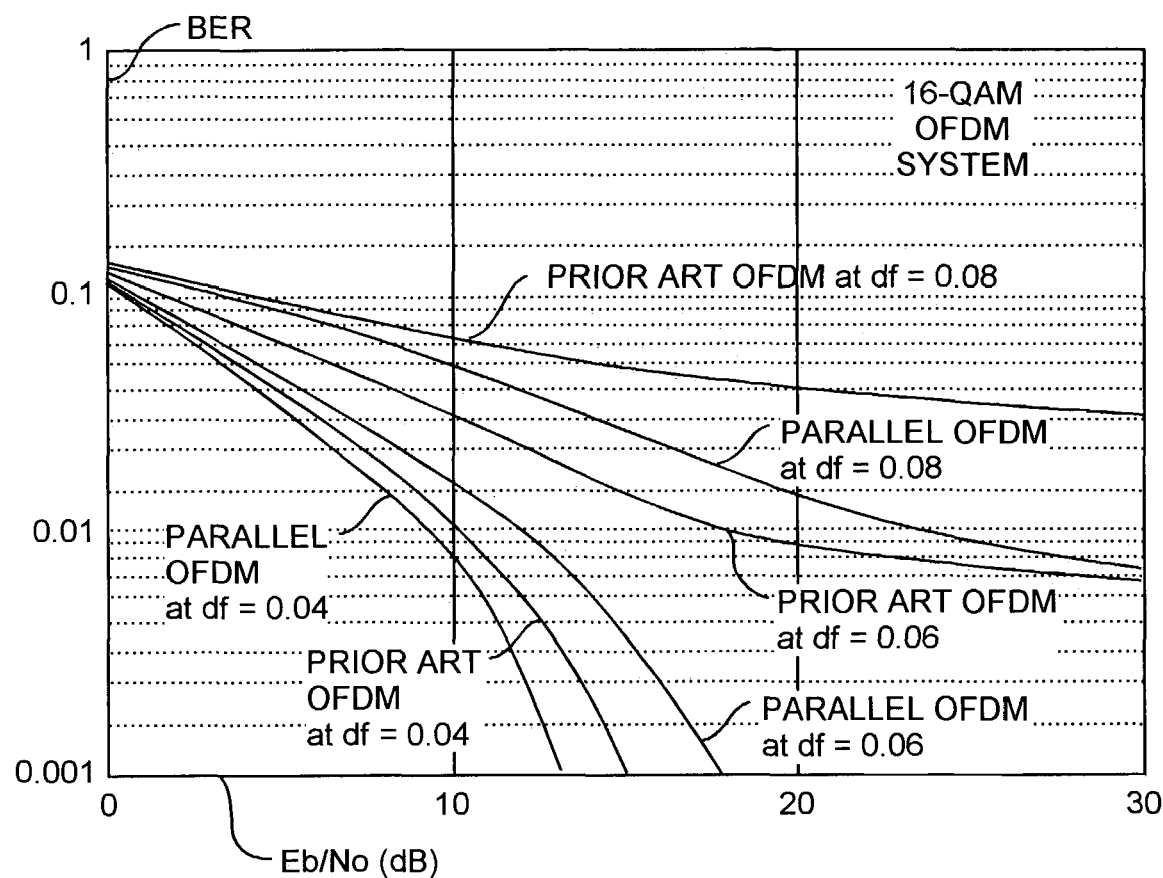
FIG. 4 is a graph of the bit error rate of orthogonal frequency division multiplexed systems.

Referring to all of the Figures, and more particularly to FIG. 4, a performance comparison in an AWGN channel between the conventional and the new parallel OFDM systems for N=16 is depicted. Without increasing signal power, when each branch at the transmitter is at half of an original signal power, the system provides improved tracking capability. The new parallel architecture expands the $0.04 \cdot \Delta f$ frequency offset limitation of the conventional architecture to $0.06 \cdot \Delta f$ when N=16. This increase indicates that the relative speed as an effectively Doppler shift is allowed to increase 50% from the current limitation without losing communication. This improvement can also be directly applied to the coarse signaling detection and acquisition process for digital communications.

The parallel OFDM system is well suited for satellite and wireless communications such as cellular base stations and mobile communication systems. The present invention preferably uses frequency division, but can be expanded to code division and time division multiplexing systems. Those skilled in the art can make enhancements, improvements, and modifications to the invention, and these enhancements, improvements, and modifications may nonetheless fall within the spirit and scope of the following claims.

What is claimed is:

1. A system for receiving an input, for communicating the input as a divisional multiplexed signal having orthogonal subcarrier components communicated over a channel, and for providing an output, the system comprising, a transmitter mapper for providing the orthogonal subcarrier components from the input, a transmitter inverse transform for respectively inverse transforming the orthogonal subcarrier components into transmitter inverse transformed signals, a transmitter forward transform for respectively forward transforming the orthogonal subcarrier components into transmitter forward transformed signals, a transmitter multiplexer for divisional multiplexing the transmitter inverse transformed signals and the transmitter forward transformed signals into the divisional multiplexed signal being communicated over the channel, a receiver demultiplexer for receiving and for divisional demultiplexing the divisional multiplexed signal into receiver inverse transformed signals and receiver forward transformed signals, the receiver inverse transformed signals originating from the transmitter inverse transformed signals and the receiver forward transformed signals originating from the transmitter forward transformed signals, a receiver forward transform for forward transforming the receiver inverse transformed signals into first parallel mapped signals, a receiver inverse transform for inverse transforming the receiver forward transform signals into second parallel mapped signals, a receiver mapper for respectively mapping the first and second parallel mapped signals into first and second receiver signals, a combiner for combining the first and second receiver signals into the output.

2. The system of claim 1 wherein,
the divisional demultiplexing and divisional multiplexing is selected from the group consisting of frequency division, code division and time division.

3. The system of claim 1 wherein,
the transmitter and receiver inverse transforms are discrete transforms, and the transmitter and receiver forward transforms are discrete transforms.

4. The system of claim 1 wherein,
the transmitter inverse transforms and receiver inverse transforms are inverse fast Fourier transforms, and
the transmitter forward transforms and receiver forward transforms are forward fast Fourier transforms.

5. The system of claim 1 wherein,
orthogonality of the orthogonal subcarrier components is maintained during the transmitter and receiver inverse transforms and during the transmitter and receiver forward transforms.

6. The system of claim 1 wherein,
the divisional demultiplexing is frequency divisional demultiplexing,
the divisional multiplexing is frequency divisional multiplexing, and
the output is insensitive to relative frequency offsets of the divisional multiplexed signal during communication over the channel.

7. The system of claim 1 wherein the input is a sequence of data symbols, the transmitter mapper comprises,
a serial-to-parallel converter for converting the sequence of data symbols into parallel input symbols, and
a data-to-subcarrier mapper for mapping the parallel input symbols into the orthogonal subcarrier components.

8. The system of claim 1 wherein the receiver inverse transformed signals are received in sequence and forward transformed in parallel by the receiver forward transform, and the receiver forward transformed signals are received in sequence and inverse transformed in parallel by the receiver inverse transform, the system further comprising,
a first serial-to-parallel converter for converting the sequence of receiver inverse transformed signals into parallel receiver inverse transformed signals, and
a second serial-to-parallel converter for converting the sequence receiver forward transformed signals into parallel receiver forward transformed signals.

9. The system of claim 1 wherein the first and second mapped signals are first and second parallel mapped signals, the system further comprising,
a first subcarrier-to-data mapper for mapping the first parallel mapped signals into first parallel data symbols,
a first parallel-to-serial converter for converting the first parallel data symbols into the first receiver signals,
a second subcarrier-to-data mapper for mapping the second parallel mapped signals into second parallel data symbols,
a second parallel-to-serial converter for converting the second parallel data symbols into the second receiver signals.

10. A system for transmitting a sequence of data symbols as a divisional multiplexed signal across a channel, the system comprising a first module and a second module,
the first module comprising,
a first serial-to-parallel converter for converting the sequence of data symbols into first parallel input symbols, and
a first data-to-subcarrier mapper for mapping the first parallel input symbols into first orthogonal subcarrier components, and
a transmitter inverse transform for respectively inverse transforming the first orthogonal subcarrier components into transmitter inverse transformed signals,
the second module comprising, a transmitter forward transform for respectively forward transforming the first orthogonal subcarrier components into transmitter forward transformed signals, and
a multiplexer for divisional multiplexing the transmitter inverse transform signals and the transmitter forward transformed signals into the divisional multiplexed signal being communicated over the channel.

11. The system of claim 10 further comprising,
a second serial-to-parallel converter for converting the sequence of data symbols into second parallel input symbols, and
a second data-to-subcarrier mapper for mapping the second parallel input symbols into second orthogonal subcarrier components, the transmitter forward transform forward transforming the second orthogonal subcarrier components into the transmitter forward transform signals.

12. The system of claim 10 wherein,
the divisional multiplexing is selected from the group consisting of frequency division, code division and time division.

13. The system of claim 10 wherein,
the transmitter inverse transform is an inverse fast Fourier transform,
the transmitter forward transform is a forward fast Fourier transform, and
the divisional multiplexing is frequency division multiplexing.

14. A system for receiving a divisional multiplexed signal across a channel and for generating an output, the division multiplexed signal comprising transmitter forward transformed signals and transmitter inverse transformed signals, the system comprising a first module and a second module,
the first module comprising,
a demultiplexer for receiving and for divisional demultiplexing the divisional multiplexed signal into receiver inverse transformed signals and receiver forward transformed signals, the inverse transformed signals originating from the transmitter inverse transformed signals and the receiver forward transformed signals originating from the transmitter forward transformed signals,
a first serial-to-parallel converter for converting the receiver inverse transformed signals into parallel receiver inverse transformed signals,
a forward transform for forward transforming the parallel receiver inverse transform signals into first parallel mapped signals,
a first subcarrier-to-data mapper for mapping the first parallel mapped signals into first parallel data symbols, and
a first parallel-to-serial converter for converting the first parallel data symbols into first receiver signals,
the second module comprising,
a second serial-to-parallel converter for converting the receiver forward transformed signals into parallel receiver forward transformed signals,
a receiver inverse transform for inverse transforming the parallel receiver forward transformed signals into second parallel mapped signals,
a second subcarrier-to-data mapper for mapping the second parallel mapped signals into second parallel data symbols,
a second parallel-to-serial converter for converting the second parallel data symbols into second receiver signals, and
a combiner for combining the first and second receiver signals into the output.

15. The system of claim 14 wherein,
the divisional demultiplexing is selected from the group consisting of frequency division, code division and time division.

16. The system of claim 14 wherein,
the receiver inverse transforms are inverse fast Fourier transforms,
the receiver forward transforms are forward fast Fourier transforms, and
the divisional demultiplexing is frequency division demultiplexing.

17. The system of claim 14 wherein,
the transmitter and receiver inverse transforms are discrete transforms, and
the transmitter and receiver forward transforms are discrete transforms.

* * * * *